United States Patent
Kim et al.

(10) Patent No.: US 12,435,405 B2
(45) Date of Patent: Oct. 7, 2025

(54) HOT-DIPPED GALVANIZED STEEL SHEET HAVING EXCELLENT BENDING WORKABILITY AND CORROSION RESISTANCE AND MANUFACTURING METHOD THEREFOR

(71) Applicant: POSCO, Pohang-si (KR)

(72) Inventors: Sung-Joo Kim, Gwangyang-si (KR); Heung-Yun Kim, Pohang-si (KR); Myung-Soo Kim, Gwangyang-si (KR); Dae-Young Kang, Gwangyang-si (KR); Yong-Joo Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/782,401

(22) PCT Filed: Dec. 1, 2020

(86) PCT No.: PCT/KR2020/017344
§ 371 (c)(1),
(2) Date: Jun. 3, 2022

(87) PCT Pub. No.: WO2021/112519
PCT Pub. Date: Jun. 10, 2021

(65) Prior Publication Data
US 2023/0019786 A1    Jan. 19, 2023

(30) Foreign Application Priority Data
Dec. 6, 2019    (KR) .................. 10-2019-0162012

(51) Int. Cl.
*C23C 2/14*    (2006.01)
*B32B 15/01*    (2006.01)
(Continued)

(52) U.S. Cl.
CPC ............. *C23C 2/522* (2022.08); *B32B 15/01* (2013.01); *B32B 15/013* (2013.01); *B32B 15/04* (2013.01);
(Continued)

(58) Field of Classification Search
CPC .... C23C 2/14; C23C 2/06; C23C 2/26; C23C 2/261; C23C 2/40; C23C 2/522;
(Continued)

(56) References Cited

U.S. PATENT DOCUMENTS

| 6,579,615 B1 | 6/2003 | Sugimaru et al. |
| 9,758,853 B2 | 9/2017 | Yoshida et al. |

(Continued)

FOREIGN PATENT DOCUMENTS

| EP | 1158069 A1 | 11/2001 |
| JP | 11-343555 A | 12/1999 |

(Continued)

OTHER PUBLICATIONS

Machine Translation, Lee et al., KR 1020140074231 A, Jun. 2014. (Year: 2014).*

(Continued)

*Primary Examiner* — Michael E. La Villa
(74) *Attorney, Agent, or Firm* — Morgan Lewis & Bockius LLP

(57) ABSTRACT

A hot-dipped galvanized steel sheet of the present invention includes: a base steel sheet; a Zn—Mg—Al based plating layer provided on at least one surface of the base steel sheet and including, in wt %, with respect to components other than iron (Fe) diffused from the base steel sheet, 5.1 to 25% of Al and 4.0-10% of Mg, and the remainder of Zn and other inevitable impurities; and an interfacial alloy layer having a Fe—Al—Zn composition formed between the base steel sheet and the plating layer, wherein the interfacial alloy layer (Continued)

has a thickness of 0.5-2 μm and has a dendritic form, the Zn—Mg—Al based plating layer has a Zn—Al—MgZn$_2$ ternary eutectic structure, a Zn—MgZn$_2$ binary eutectic structure, and a structure including one or more of an Al single-phase structure having solid-solubilized Zn and a Zn single-phase structure, and agglomerated Al is included in a MgZn$_2$ structure.

6 Claims, 5 Drawing Sheets

(51) Int. Cl.
| | |
|---|---|
| *B32B 15/04* | (2006.01) |
| *B32B 15/18* | (2006.01) |
| *C22C 18/00* | (2006.01) |
| *C22C 18/04* | (2006.01) |
| *C23C 2/00* | (2006.01) |
| *C23C 2/06* | (2006.01) |
| *C23C 2/20* | (2006.01) |
| *C23C 2/26* | (2006.01) |
| *C23C 2/28* | (2006.01) |
| *C23C 2/40* | (2006.01) |
| *C23C 28/00* | (2006.01) |
| *C23C 28/02* | (2006.01) |
| *C23C 30/00* | (2006.01) |

(52) U.S. Cl.
CPC ............ *B32B 15/043* (2013.01); *B32B 15/18* (2013.01); *C22C 18/00* (2013.01); *C22C 18/04* (2013.01); *C23C 2/06* (2013.01); *C23C 2/14* (2013.01); *C23C 2/20* (2013.01); *C23C 2/26* (2013.01); *C23C 2/261* (2022.08); *C23C 2/28* (2013.01); *C23C 2/285* (2013.01); *C23C 2/40* (2013.01); *C23C 28/021* (2013.01); *C23C 28/023* (2013.01); *C23C 28/025* (2013.01); *C23C 28/3225* (2013.01); *C23C 30/00* (2013.01); *C23C 30/005* (2013.01); *Y10T 428/12757* (2015.01); *Y10T 428/12799* (2015.01); *Y10T 428/12951* (2015.01); *Y10T 428/12958* (2015.01); *Y10T 428/12972* (2015.01); *Y10T 428/2495* (2015.01); *Y10T 428/24967* (2015.01); *Y10T 428/265* (2015.01); *Y10T 428/27* (2015.01)

(58) Field of Classification Search
CPC .. C23C 2/28; C23C 2/285; C23C 2/20; C23C 30/00; C23C 30/005; C23C 28/025; C23C 28/3225; C23C 28/021; C23C 28/023; C22C 18/04; C22C 18/00; B32B 15/01; B32B 15/013; B32B 15/04; B32B 15/043; B32B 15/18; Y10T 428/12799; Y10T 428/12757; Y10T 428/12951; Y10T 428/12958; Y10T 428/12972; Y10T 428/24967; Y10T 428/2495; Y10T 428/265; Y10T 428/27

See application file for complete search history.

(56) References Cited

U.S. PATENT DOCUMENTS

| | | | |
|---|---|---|---|
| 2012/0282488 | A1 | 11/2012 | Fujii et al. |
| 2018/0002797 | A1* | 1/2018 | Oh ............... B32B 15/012 |
| 2019/0010595 | A1 | 1/2019 | Oh et al. |
| 2019/0390303 | A1† | 12/2019 | Tokuda et al. |
| 2020/0002798 | A1† | 1/2020 | Tokuda et al. |
| 2021/0010106 | A1† | 1/2021 | Kim et al. |
| 2021/0079498 | A1† | 3/2021 | Mitsunobu |
| 2021/0198780 | A1 | 7/2021 | Mitsunobu |

FOREIGN PATENT DOCUMENTS

| | | | |
|---|---|---|---|
| JP | 2002-275611 A | | 9/2002 |
| JP | 2003-155549 A | | 5/2003 |
| JP | 3704311 B2 | | 10/2005 |
| JP | 2005273019 | † | 10/2005 |
| JP | 2005-336546 A | | 12/2005 |
| JP | 2006283155 | † | 10/2006 |
| JP | 2011-214145 A | | 10/2011 |
| JP | 2012-246547 A | | 12/2012 |
| JP | 6350780 B1 | | 7/2018 |
| KR | 10-2001-0099943 A | | 11/2001 |
| KR | 10-2012-0112450 A | | 10/2012 |
| KR | 10-1376381 | † | 3/2014 |
| KR | 10-2014-0074231 A | | 6/2014 |
| KR | 10-2016-0078918 A | | 7/2016 |
| KR | 10-1665883 B1 | | 10/2016 |
| KR | 10-1714935 B1 | | 3/2017 |
| KR | 10-2017-0076924 A | | 7/2017 |
| KR | 10-2019-0078509 A | | 7/2019 |
| WO | 2011/118797 A1 | | 9/2011 |
| WO | 2018/139619 | † | 8/2018 |
| WO | 2018139620 | † | 8/2018 |
| WO | 2018/169084 | † | 9/2018 |
| WO | 2018/169084 A1 | | 9/2018 |
| WO | 2019132412 | † | 7/2019 |

OTHER PUBLICATIONS

International Search Report dated Mar. 31, 2021 issued in International Patent Application No. PCT/KR2020/017344 (with English translation).
Wang, et al., "Type, Structure and Performance of Hot-Dip Galvanized Coatings", Corrosion & Protection, vol. 29, No. 4, Apr. 15, 2008, p. 202-206, (see English Abstract).
Office Action issued Apr. 11, 2023 for counterpart Chinese Patent Application No. 202080084257.3.
Office Action issued Apr. 20, 2023 for counterpart Japanese Patent Application No. 2022-532730 (see English translation).
Indian Office Action dated Nov. 2, 2022 issued in Indian Patent Application No. 202217033381 (with English translation).

\* cited by examiner
† cited by third party

[Fig.1]
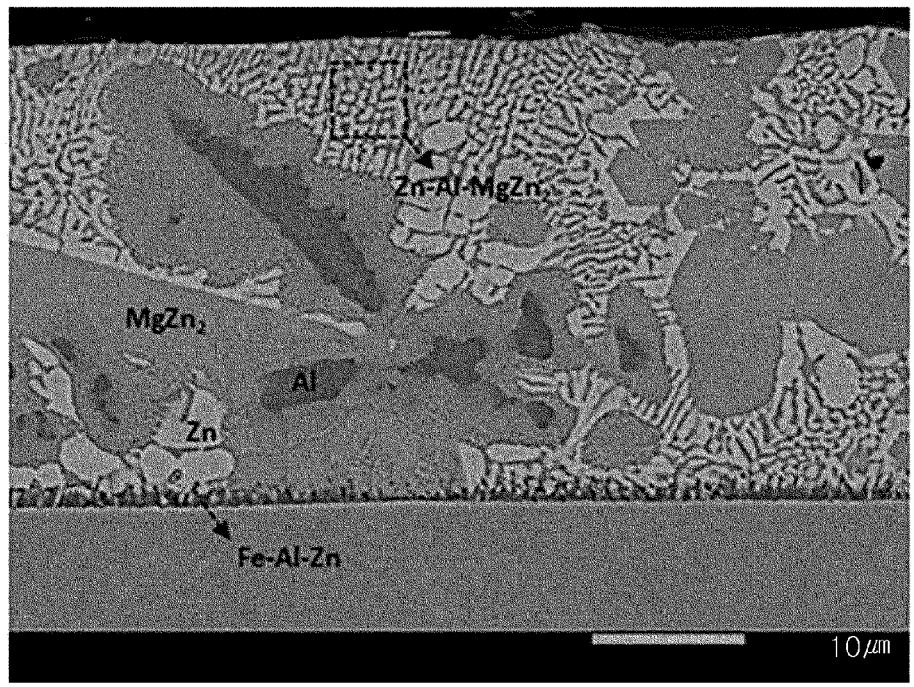
[Fig.2]
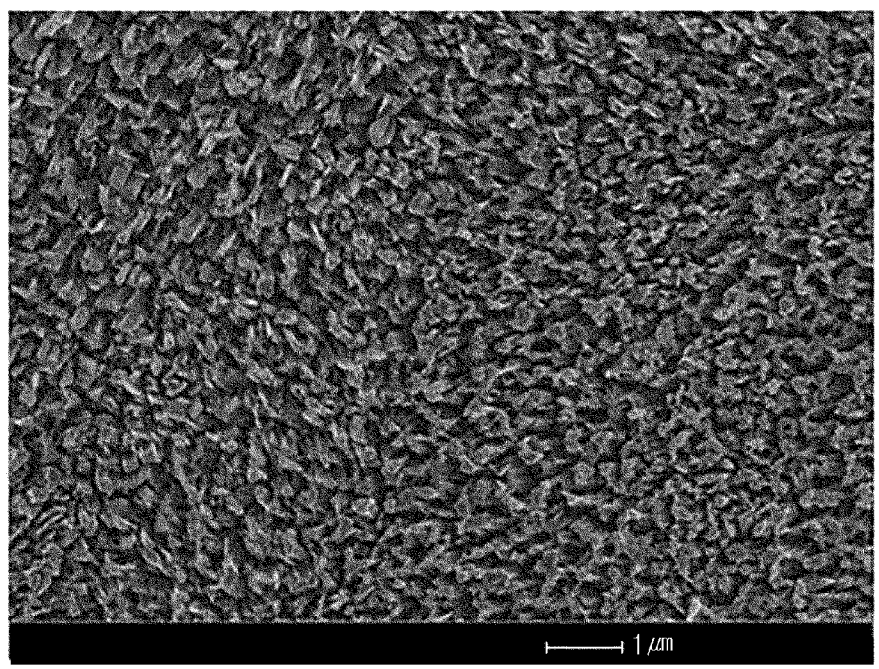

[Fig.3]
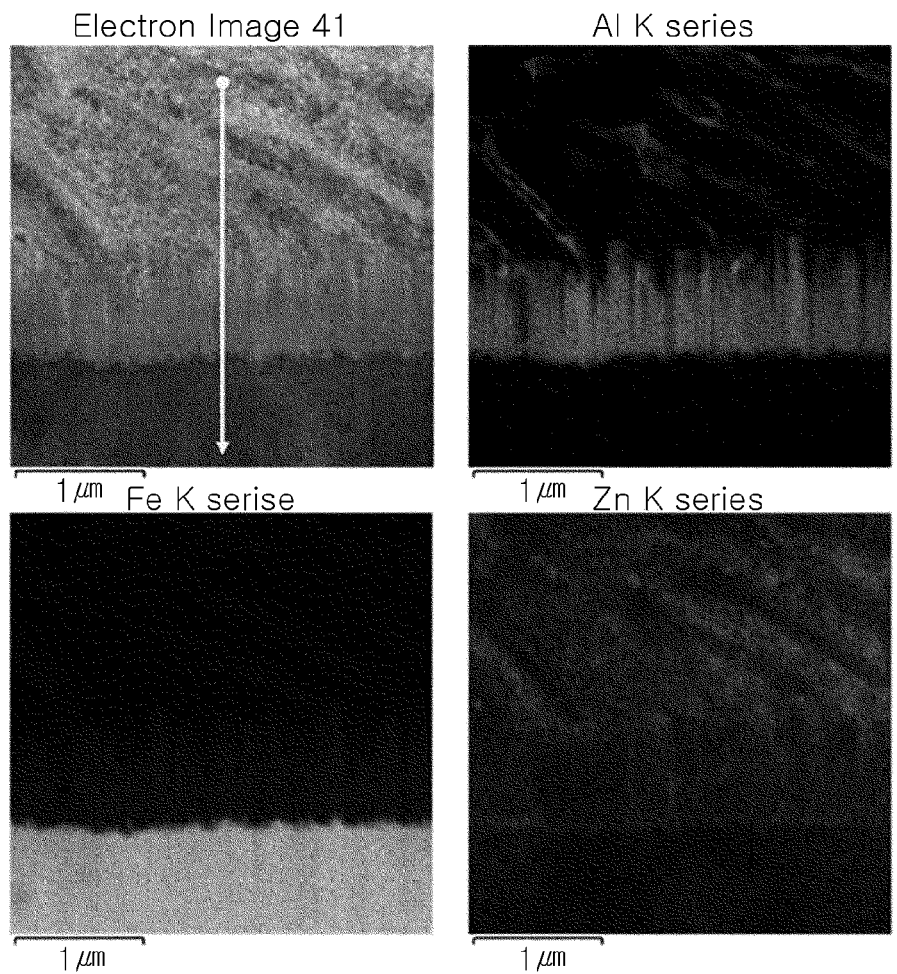

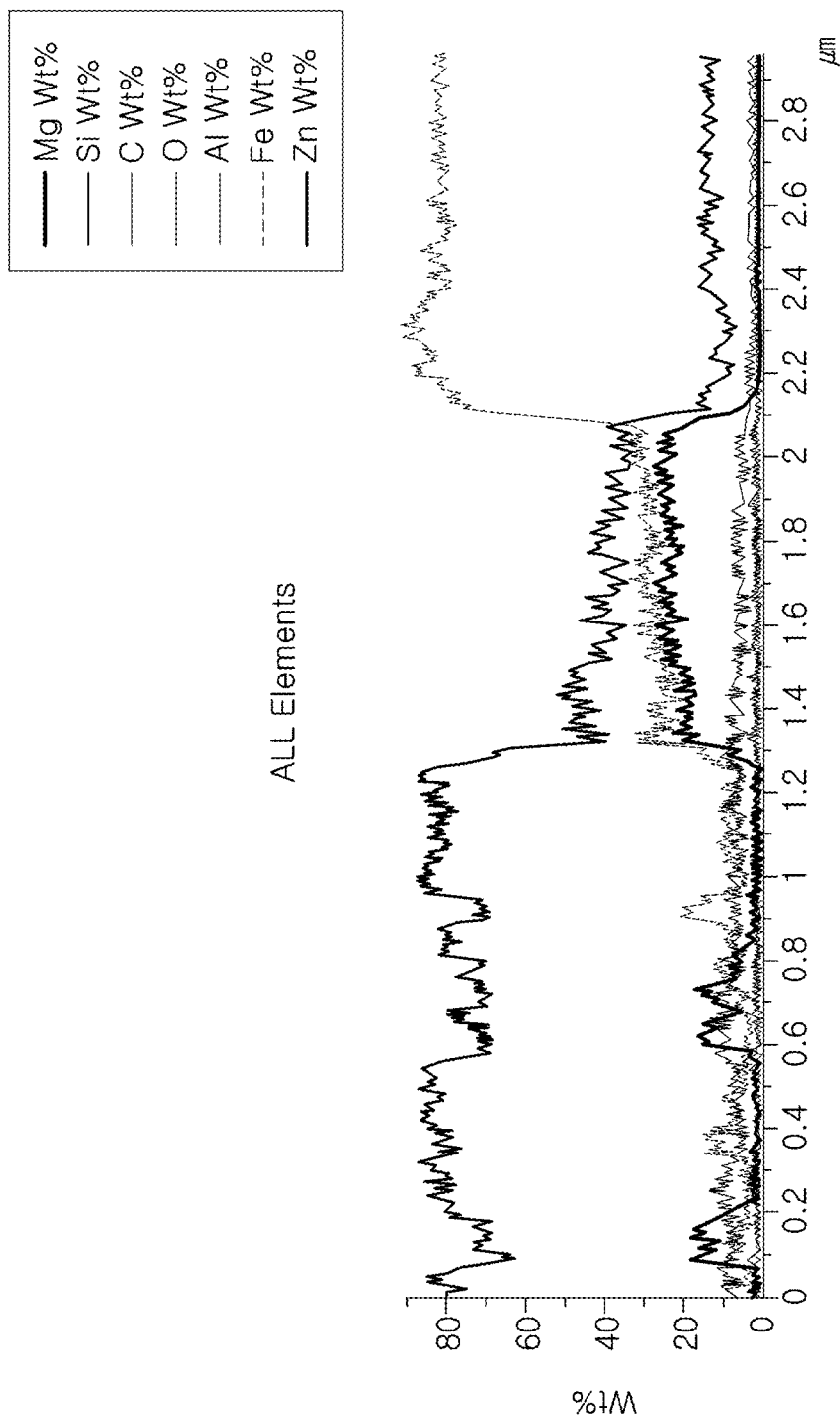
[Fig. 4]

[Fig.5]
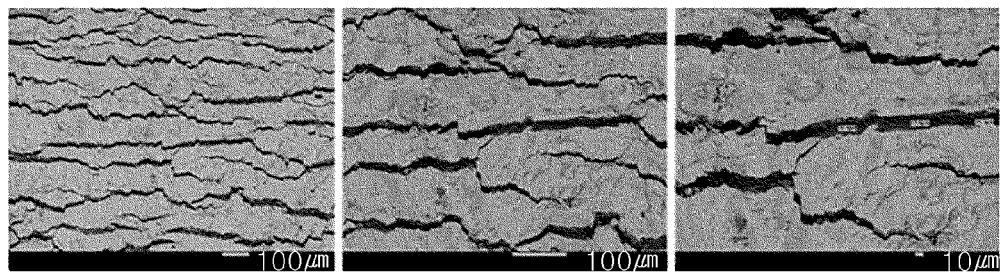
[Fig.6]
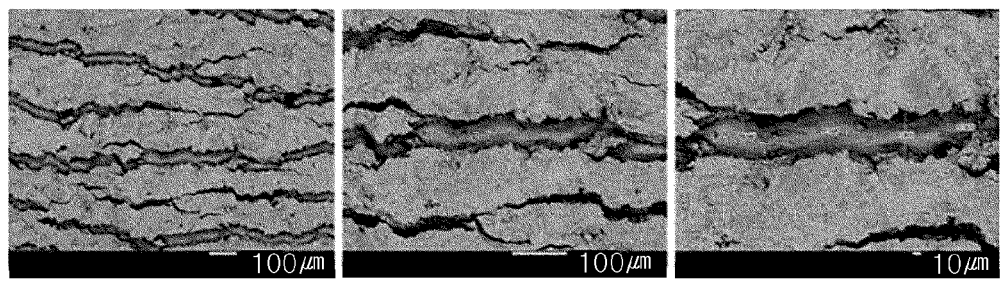
[Fig.7]
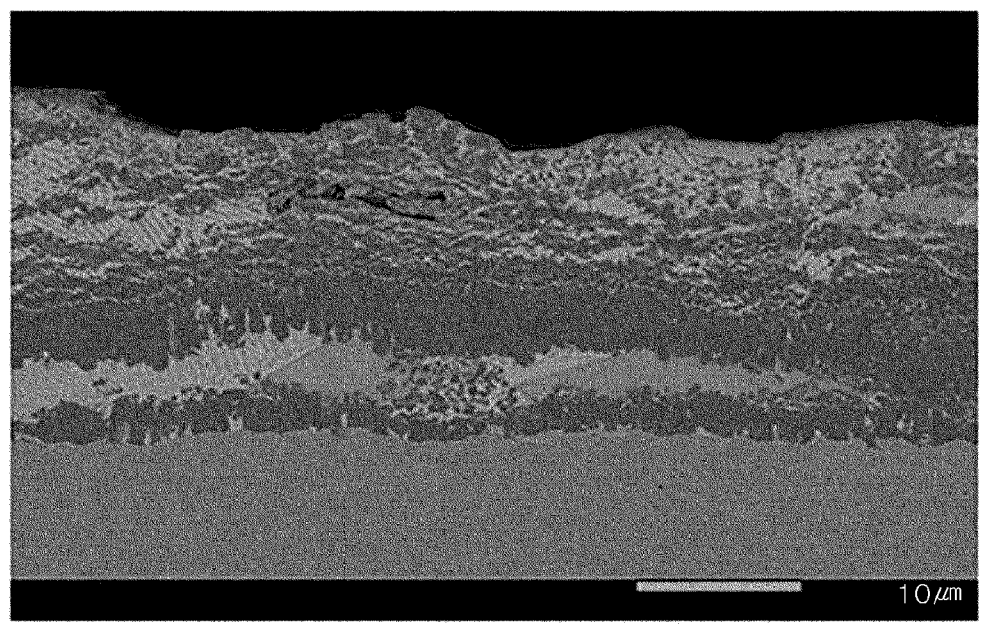

【Fig.8】
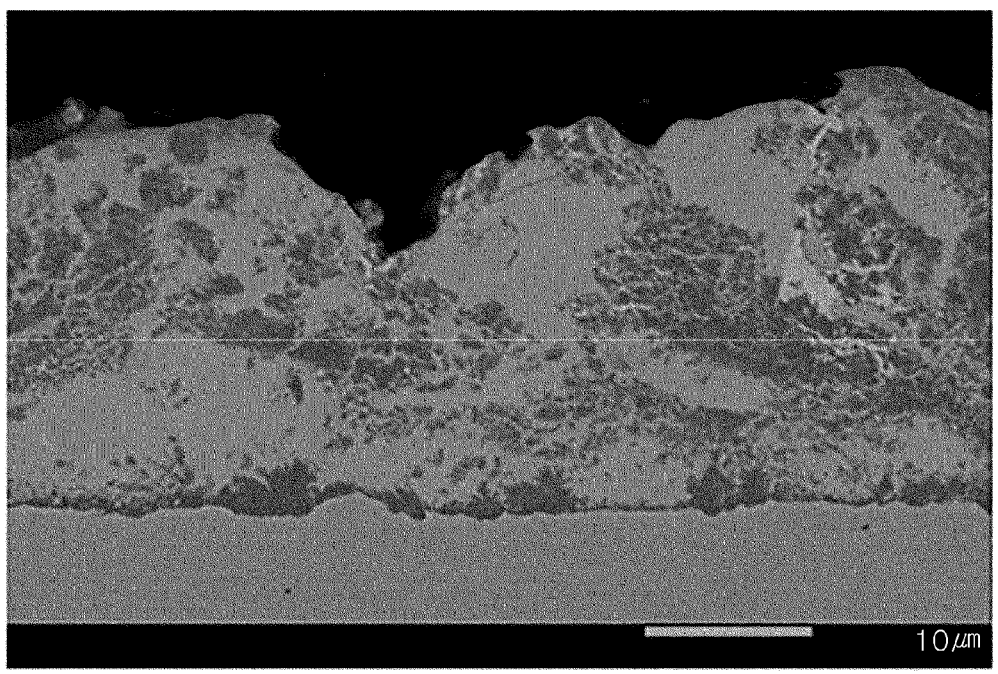
【Fig.9】
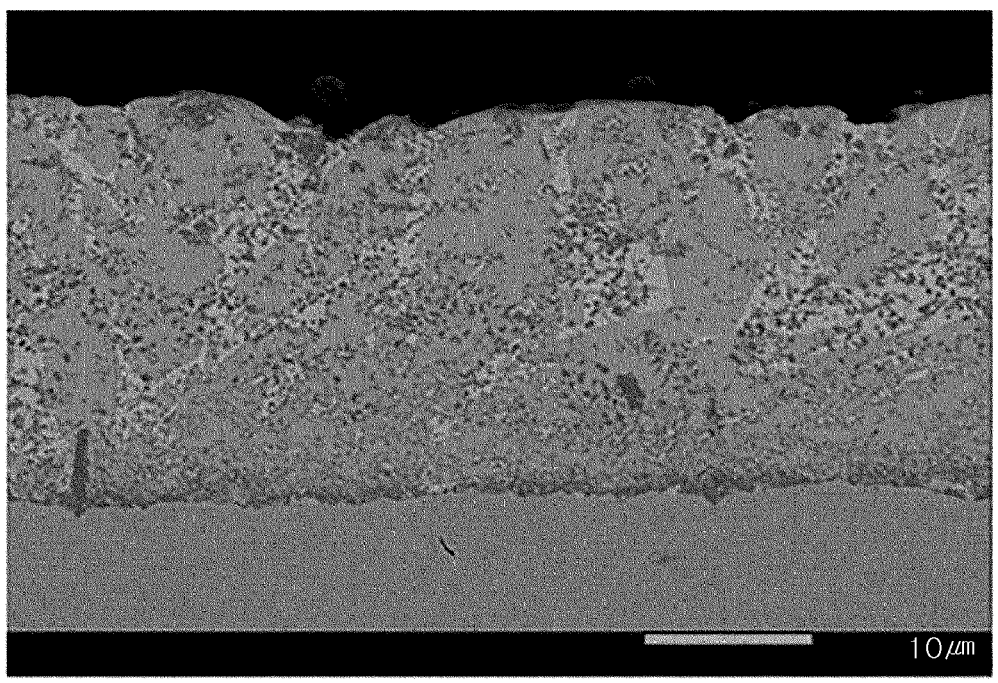

HOT-DIPPED GALVANIZED STEEL SHEET HAVING EXCELLENT BENDING WORKABILITY AND CORROSION RESISTANCE AND MANUFACTURING METHOD THEREFOR

CROSS-REFERENCE OF RELATED APPLICATIONS

This application is the U.S. National Phase under 35 U.S.C. § 371 of International Patent Application No. PCT/KR2020/017344, filed on Dec. 1, 2020, which in turn claims the benefit of Korean Application No. 10-2019-0162012, filed on Dec. 6, 2019, the entire disclosures of which applications are incorporated by reference herein.

TECHNICAL FIELD

The present disclosure relates to a hot-dipped galvanized steel sheet having excellent bending workability and corrosion resistance and a manufacturing method thereof.

BACKGROUND ART

A zinc-plated, hot-dipped galvanized steel sheet has a sacrificial characteristic in which when it is exposed to a corrosive environment, zinc having a lower oxidation-reduction potential than iron corrodes first to suppress corrosion of a steel material. In addition, as zinc in a plating layer is oxidized, a dense corrosion product is formed on the surface of a steel material to block the steel material from an oxidation atmosphere, thereby improving corrosion resistance of the steel plate. Due to the beneficial properties as such, the scope of application of the hot-dipped galvanized steel sheet has been recently expanded to steel sheets for home appliances and automobiles.

However due to an increase in air pollution caused by industrial development, a corrosive environment gradually deteriorates, and due to strict regulations of resource and energy conservation, there is a growing need for development of a steel material having better corrosion resistance than a conventional galvanized steel material.

In order to improve the problem, various studies related to a manufacturing technology of a zinc alloy-based plated steel material, which improves corrosion resistance of a steel material by adding elements such as aluminum (Al) and magnesium (Mg) to a zinc plating bath, have been conducted. As a representative example, a study related to a manufacturing technology of a Zn—Mg—Al-based zinc alloy plated steel sheet in which Mg is further added to a Zn—Al plating composition system as a zinc alloy-based plating material is actively being conducted.

However, the Zn—Mg—Al-based zinc alloy plated steel sheet has excellent corrosion resistance, but poor bending workability, as compared with a galvanized steel sheet. That is, the zinc alloy plated steel sheet includes a large amount of a Zn—Al—Mg-based intermetallic compound formed by a thermodynamic interaction of Zn, Al, and Mg in a plating layer, and since the intermetallic compound has a high hardness, cracks may be caused in the plating layer during bending processing, resulting in reduction of bending workability. Such cracks damage the appearance of a bending processed part or becomes a cause of deterioration of corrosion resistance.

There are various factors affecting crack formation in the processing, but it is known that the hardness of a plating layer and an interfacial alloy layer affect in terms of the physical properties of a material. For this, various process changes are being attempted so that local coarsening of $MgZn_2$ phase having the highest hardness of the Zn—Al—Mg-based intermetallic compounds is suppressed and the phase is uniformly distributed in a plating layer.

However, the local coarsening of the $MgZn_2$ phase in a Mg—Al—Zn component system including a large amount of Mg is still fundamentally inevitable, and in order to minimize crack formation during bending processing, attempts are being made to suppress growth of a Fe—Al interfacial alloy phase formed between a plating layer and base iron by adding a small amount of Si to the Zn—Mg—Al plating system. The Fe—Al interfacial alloy phase as such generally grows a $Fe_2Al_5$ phase and has a high hardness, and thus, it is known that when Fe—Al interfacial alloy phase coarsely grows into a layered form, it is vulnerable to interface breakdown during processing. However, the technology of adding a small amount of Si as such is generally finely adjusted to 0.1 to 0.2 wt %, but when Si is excessively added, an additional alloy phase in the form of $Mg_2Si$ may be coarsely formed in the plating layer. Therefore, it is very important characteristic related to stability of forming and corrosion resistance after processing to secure consistent bending workability.

RELATED ART DOCUMENT

Patent Document (Patent Document 1) Japanese Patent Laid-Open Publication No. 2003-155549

DISCLOSURE

Technical Problem

An aspect of the present disclosure is to provide a hot-dipped galvanized steel sheet having a Zn—Al—Mg-based plating layer which may reduce cracks in a plating layer during bending processing forming to secure excellent bending workability and corrosion resistance, and a manufacturing method thereof.

An object of the present disclosure is not limited to the above description. Any person with ordinary skill in the art to which the present disclosure pertains will have no difficulty in understanding further objects of the present disclosure from the general details the specification of the present disclosure.

Technical Solution

According to an aspect of the present disclosure, a hot-dipped galvanized steel sheet having excellent bending workability and corrosion resistance includes:

a base steel sheet;

a Zn—Mg—Al-based plating layer which is provided on at least one surface of the base steel sheet and includes, by weight: 5.1 to 25% of Al and 4.0 to 10% of Mg, with a remainder of Zn and other inevitable impurities, with respect to components other than iron (Fe) diffused from the base steel sheet; and an interfacial alloy layer having a Fe—Al—Zn composition formed between the base steel sheet and the plating layer, wherein the interfacial alloy layer has a thickness of 0.5 to 2 μm and is in a dendritic form, the Zn—Mg—Al-based plating layer has a structure including one or more of a Zn—Al—MgZn$_2$ ternary eutectic structure, a Zn—MgZn$_2$ binary eutectic structure, a Zn-solid solubilized Al phase structure, and a Zn phase structure, and agglomerated Al is included in a MgZn$_2$ structure.

In the present disclosure, Al and Mg contents may be determined to be positioned in a 2-eutectic line of MgZn$_2$ and Al of a Mg—Al—Zn ternary phase diagram.

Widths of bending cracks produced in 90° bending and 0T bending processing of a plating layer including the base steel sheet may be 30 μm or less and 100 μm or less, respectively.

According to another aspect of the present disclosure, a manufacturing method of a hot-dipped galvanized steel sheet includes:

preparing a base steel sheet;

hot dip galvanizing the base steel sheet in a plating bath including, by weight: 5.1 to 25% of Al and 4.0 to 10% of Mg, with a remainder of Zn and other inevitable impurities; and cooling the plated steel sheet, starting from a plating bath surface to a top roll section, at a cooling rate of 5 to 30° C./s, using inert gas, thereby manufacturing a hot-dipped galvanized steel sheet in which an interfacial alloy layer and a Zn—Mg—Al-based plating layer are sequentially formed on the base steel sheet, wherein the base steel sheet is plated by being dipped in a plating bath having a temperature (T) to allow a thickness (H) of the interfacial alloy layer defined by the following Relation 1 to satisfy a range of 0.5 to 2 μm:

$$H(\mu m)=170.53+0.0008T^2-0.7376T \quad \text{Relation 1}$$

the Zn—Mg—Al-based plating layer has a structure including one or more of a Zn—Al—MgZn$_2$ ternary eutectic structure, a Zn—MgZn$_2$ binary eutectic structure, a Zn-solid solubilized Al phase structure, and a Zn phase structure, and agglomerated Al is included in a MgZn$_2$ structure.

A temperature of the plating bath may be maintained in a range of 470 to 520° C.

Al and Mg contents may be determined to be positioned in a 2-eutectic line of MgZn$_2$ and Al of a Mg—Al—Zn ternary phase diagram.

A bathing time during which the base steel sheet is dipped in the plating bath may be 1 to 5 seconds.

The inert gas may be one of N, Ar, and He.

Advantageous Effects

The hot-dipped galvanized steel sheet according to the present disclosure has excellent bending workability and corrosion resistance. In addition, according to the present disclosure, a hot-dipped galvanized steel sheet, which has excellent bending workability such that a width of a crack measured by performing a 90° bending processing test on a hot-dipped galvanized steel sheet having a plating layer including: 5.1 to 25 wt % of Al and 4.0 to 10 wt % of Mg with no Si is as low as 30 μm or less, and has excellent corrosion resistance even after processing, may be provided.

DESCRIPTION OF DRAWINGS

FIG. 1 is a photograph of a cross section of a hot-dipped galvanized steel sheet of Inventive Example 1 which is a preferred exemplary embodiment in the present disclosure, observed by a field emission scanning electron microscope (hereinafter, referred to as "FE-SEM") (2,000× magnification).

FIG. 2 is a photograph of a surface of an interfacial alloy layer of the hot-dipped galvanized steel sheet of Inventive Example 1 which is a preferred exemplary embodiment in the present disclosure, observed by FE-SEM (10,000× magnification).

FIG. 3 is mapping photographs of Fe, Al, and Zn components of a replica sample obtained from cross section polishing for an interfacial alloy layer of the hot-dipped galvanized steel sheet of Inventive Example 1 which is a preferred exemplary embodiment in the present disclosure, observed by TEM-EDS.

FIG. 4 illustrates weight percentages (wt %) detected along a yellow line marked on FIG. 3 for the interfacial alloy layer of the hot-dipped galvanized steel sheet of Inventive Example 1 which is a preferred exemplary embodiment in the present disclosure.

FIG. 5 is photographs of cracks produced on a bending processing top after performing a 90° bending processing on the hot-dipped galvanized steel sheet of Inventive Example 1 which is a preferred exemplary embodiment in the present disclosure, observed by FE-SEM (100×, 200×, and 300× magnifications).

FIG. 6 is photographs of cracks produced on a bending processing top after performing a 90° bending processing on a hot-dipped galvanized steel sheet of Comparative Example 1, observed by FE-SEM (100×, 200×, and 300× magnifications).

FIG. 7 is a photograph of a cross section of Comparative Example 4, observed by FE-SEM (2,000× magnification).

FIG. 8 is a photograph of a cross section of Comparative Example 5, observed by FE-SEM (2,000× magnification).

FIG. 9 is a photograph of across section of Comparative Example 6, observed by FE-SEM (2,000× magnification).

BEST MODE FOR INVENTION

Hereinafter, the present disclosure will be described.

As described above, as a method of minimizing crack formation occurring in bending processing of a Mg—Al—Zn plated steel sheet generally including a large amount of Mg, a method of adding a small amount of Si to a plating bath to suppress coarsening of an interfacial alloy phase having high hardness formed between a plating layer and base iron is suggested. However, the method has a limitation since an additional alloy phase in the form of Mg$_2$Si in the plating layer may be coarsely formed.

Thus, in order to minimize cracks occurring in bending processing while maintaining excellent corrosion resistance which is a merit of a zinc-based alloy plated steel sheet including a large amount of Mg, the present inventors reviewed components and shape of an interfacial alloy phase and cracks occurring in bending processing depending on addition of Si in detail, completed the present disclosure based on the results.

The hot-dipped galvanized steel sheet of the present disclosure as such includes: a base steel sheet; a Zn—Mg—Al-based plating layer which is provided on at least one surface of the base steel sheet and includes, by weight: 5.1 to 25% of Al and 4.0 to 10% of Mg, with a remainder of Zn and other inevitable impurities, with respect to components other than iron (Fe) diffused from the base steel sheet; and an interfacial alloy layer having a Fe—Al—Zn composition formed between the base steel sheet and the plating layer.

In addition, the interfacial alloy layer has a thickness of 0.5 to 2 μm and is in a dendritic form, the Zn—Mg—Al-based plating layer has a structure including one or a Zn—Al—MgZn$_2$ ternary eutectic structure, a Zn—MgZn$_2$ binary eutectic structure, a Zn-solid solubilized Al phase structure, and a Zn phase structure, and agglomerated Al is included in a MgZn$_2$ structure.

First, the hot-dipped galvanized steel sheet according to an aspect in the present disclosure may include: abase steel sheet; a Zn—Mg—Al-based plating layer provided on at least one surface of the base steel sheet; and a Fe—Al—Zn interfacial alloy layer formed between the base steel sheet and the plating layer.

A plating layer formed of a Zn—Mg—Al-based alloy may be provided on at least one surface of the base steel sheet. The plating layer may be formed on only one surface of the base steel sheet or may be formed on both surfaces of the base steel sheet.

In the present disclosure, the Zn—Mg—Al-based plating layer may include, by weight: 5.1 to 25% of Al and 4.0 to 10% of Mg, with a remainder of Zn and other inevitable impurities, with respect to components other than iron a small amount of iron (Fe) diffused from the base steel sheet.

Al: 5.1 to 25%, Mg: 4.0 to 10%

Mg in the plating layer, which is an element which serves to improve corrosion resistance of a plated steel sheet, uniformly produces a corrosion product, and since the corrosion product formed therefrom does not progress corrosion any more, this results in improvement of corrosion resistance.

In general, when Mg is added at less than 1.0%, an effect of corrosion resistance improvement is insignificant, and when Mg is added at more than 2.0%, occurrence of dross floating in a plating bath increases by Mg oxidation in the plating bath, and thus, dross should be removed often to deteriorate operability. Thus, in the conventional technology, in Zn—Mg—Al-based zinc alloy plating, Mg is added at 1.0% or more, but the upper limit of a Mg content is set around 3.0%.

However, in the present disclosure, 4.0% or more of Mg is added to the plating layer, and also, in order to suppress Mg oxide dross in the zinc alloy plating bath, 5.1% of more of Al may be added. In addition, Al is combined with Zn and Mg to serve to improve corrosion resistance of the plated steel sheet.

Meanwhile, as described above, in the Zn—Mg—Al ternary alloy plating, Mg is known to play an auxiliary role to further stabilize formation of a corrosion product of Zn, but when a Mg content is more than 10%, a rate at which Mg corrodes on its own is higher than a rate at which Zn stabilizes a corrosion product, so that the corrosion resistance of the plated steel sheet is rather deteriorated, and thus, the upper limit of the Mg content in the plating layer may be limited to 10% or less.

In addition, at a Mg content of 4.0 to 10%, when more than 25% of Al is added, a melting point is 480° C. or higher, and considering that the temperature of the plating bath is generally set higher by 40 to 60° C. than the melting point of the plating composition system, erosion of a plating bath structure and deformation of a steel material may be caused by the excessively high temperature of the plating bath, and thus, in view of this, an Al content may be limited to 25% or less.

Further, Al and Mg contents may be determined to be positioned in a 2-eutectic line of MgZn$_2$ and Al of a Mg—Al—Zn ternary phase diagram. Here, being determined to be positioned in a 2-eutectic line includes not only a case of being determined to be exactly positioned in the 2-eutectic line, but also a case of being determined to be positioned near the 2-eutectic line, slightly off the 2-eutectic line.

The remainder of the composition of the plating layer described above may be Zn and other inevitable impurities. The inevitable impurities are unintentionally incorporated in a common manufacturing process of a hot-dipped galvanized steel sheet and may not be excluded completely, and the meaning may be easily understood by a person skilled in the art.

Meanwhile, in general, a unique plating structure shape known as spangle may easily appear in the hot-dipped galvanized steel sheet. The spangle occurs due to the characteristic of the solidification reaction of zinc. That is, when zinc is solidified, a dendrite in the form of a branch grows starting from a solidification nucleus to form a skeleton of a plating structure, and an unsolidified molten zinc pool remaining in the dendrite is finally solidified to finish solidification of the plating layer. In the case in which Al is separated from MgZn$_2$ and formed into a primary crystal structure, the Al primary crystal structure grows into dendrite form, and the Al dendrite form becomes severe as a plating amount is larger and a solidification rate is lower. When the Al primary crystal structure in the dendrite form as such grows too large, bending of the plating layer is deepened to adversely affect a surface appearance, and Al having good oxidation reactivity is excessively exposed to the surface to deteriorate the oxidation stability of the plated steel sheet.

However, in the present disclosure, Al and Mg contents are determined to be positioned in a 2-eutectic line of MgZn$_2$ and Al of a Mg—Al—Zn ternary phase diagram, thereby solving the problem.

In addition, in the present disclosure, the Zn—Mg—Al-based plating layer has a microstructure including one or more of a Zn—Al—MgZn$_2$ ternary eutectic structure, a Zn—MgZn$_2$ binary eutectic structure, a Zn solid-solubilized Al phase structure, and a Zn phase structure. Further, since agglomerated Al is included in a MgZn$_2$ structure, the spangle occurrence problem as described above may be solved.

In addition, in the hot-dipped galvanized steel sheet of the present disclosure, a Fe—Al—Zn interfacial alloy layer formed of a Fe—Al—Zn intermetallic compound may be formed between the base steel sheet and the plating layer. The interfacial alloy layer may be formed by Fe diffused from a base steel sheet in the early stage of plating and Al and Zn in the plating bath, and serve to improve adhesion between the base steel sheet and the plating layer and also serve as a suppression layer to suppress additional diffusion of Fe from the base steel sheet to the plating layer.

In the present disclosure, the interfacial alloy layer has a shape of a dendritic form having a Fe—Al—Zn composition, and the interfacial alloy layer in the dendritic form causes an anchoring effect, which is very beneficial for reducing cracks in bending processing.

In the present disclosure, the thickness of the Fe—Al—Zn interfacial alloy layer is limited to a range of 0.5 μm or more and 2 μm or less. In the case in which the thickness is less than 0.5 μm, the shape of the interfacial alloy phase does not sufficiently grow into a dendritic form, does not cause an anchoring effect between the base steel sheet and the plating layer, and has poor bending workability. Meanwhile, when the thickness is more than 2 μm, a lower portion of the interfacial alloy phase in the base steel sheet direction grows thick in a layered form to be vulnerable to interfacial destruction in processing.

The hot-dipped galvanized steel sheet of the present disclosure having the constitution as described above has a plating layer formed of the alloy composition and the microstructure described above, and thus, may provide better corrosion resistance than a conventional zinc-based alloy plated steel sheet containing 3.0% or less of Mg and may minimize the width of cracks in bending processing.

Next, the manufacturing method of a hot-dipped galvanized steel sheet according to another aspect of the present disclosure will be described in detail.

The manufacturing method of a hot-dipped galvanized steel sheet of the present disclosure includes: preparing a base steel sheet; hot dip galvanizing the base steel sheet in a plating bath including, by weight, 5.1 to 25% of Al and 4.0 to 10% of Mg, with a remainder of Zn and other inevitable impurities; and cooling the plated steel sheet, starting from a plating bath surface to a top roll section, at a cooling rate of 5 to 30° C./s, using inert gas, thereby manufacturing a hot-dipped galvanized steel sheet in which an interfacial alloy layer and a Zn—Mg—Al-based plating layer are sequentially formed on the base steel sheet. Further, the base steel sheet is plated by being dipped in a plating bath having a temperature (T) to allow a thickness (H) of the interfacial alloy layer defined by the following Relation 1 to satisfy a range of 0.5 to 2 μm.

First, in the present disclosure, a base steel sheet is prepared, and the specific kind of base steel sheet is not limited in the present disclosure. For example, a cold rolled steel sheet or a hot rolled steel sheet which is a general carbon steel may be used without limitation.

Next, in the present disclosure, the base steel sheet is hot dip galvanized by being dipped in a plating bath including, by weight: 5.1 to 25% of Al and 4.0 to 10% of Mg, with a remainder of Zn and other inevitable impurities.

The plating bath of the present disclosure includes no Si, and is prepared by preparing a plating bath including, by weight: 5.1 to 25% of Al and 4.0 to 10% of Mg, with a remainder of Zn and other inevitable impurities. In order to prepare the plating bath having the composition described above, a composite ingot containing predetermined Zn, Al, and Mg, or a Zn—Mg or Zn—Al ingot containing separate components may be used. In addition, Al and Mg contents may be determined to be positioned in a 2-eutectic line of $MgZn_2$ and Al of a Mg—Al—Zn ternary phase diagram.

In the present disclosure, the hot dip coating is performed by dipping the base steel sheet in the plating bath having the composition described above.

Here, in the present disclosure, it is characterized in that the temperature of the plating bath is determined considering the thickness of the interfacial alloy layer comprising the finally manufactured plated steel sheet. Specifically, it is characterized in that the plating is performed by dipping the base steel sheet in a plating bath having a temperature (T) to allow a thickness (H) of the interfacial alloy layer defined by the following Relation 1 to satisfy a range of 0.5 to 2 μm. Thus, the shape of the interfacial alloy layer having the Fe—Al—Zn composition comprising the manufactured hot dip coated steel sheet may be formed into the dendritic form. As described above, the interfacial alloy phase in the dendritic form causes an anchoring effect, and thus, is very beneficial for reducing cracks in bending processing.

$$H(\mu m)=170.53+0.0008T^2-0.7376T \quad \text{Relation 1}$$

In the case in which the temperature of the plating bath is too low, the dissolution of an ingot is very slow and the viscosity of the plating bath is high, so that it may be difficult to secure excellent surface quality of the plating layer. However, when the temperature is too high, ash defects by Zn evaporation may be caused on a plated surface. Most of all, an excessively high temperature of the plating bath when Si is not added excessively derives Fe dissolution from the base steel sheet to the plating layer to cause outburst which is the cause of peeling of the plating layer.

In order to prevent the phenomenon and also to form the interfacial alloy phase in the dendritic form having a Fe—Al—Zn composition, the temperature (T) of the plating bath should be set in a range of 470 to 520° C., and the relation with the thickness (H) of the interfacial alloy phase satisfies Relation 1.

In addition, the temperature of the base steel sheet when dipped in the plating bath is preferably different from the temperature of the plating bath by in a range of 5° C. or more and 10° C. or less, and it is desirable to dip the base steel sheet in the plating bath for a bathing time of 1 to 5 seconds.

Thereafter, in the present disclosure, the plated steel sheet is cooled, starting from a plating bath surface to a top roll section, at a cooling rate of 5 to 30° C./s, using inert gas, thereby manufacturing a hot-dipped galvanized steel sheet in which an interfacial alloy layer and a Zn—Mg—Al-based plating layer are sequentially formed on the base steel sheet.

That is, cooling is performed by lifting the plated steel sheet to start cooling from the bath surface to a top roll section at a rate of 5 to 30° C./s, using inert gas. The inert gas may be one of N, Ar, and He, and in terms of reducing manufacturing costs, it is more preferred to use N.

Here, when the cooling rate from the bath surface to the top roll section is 5° C./sec or less, the $MgZn_2$ structure is developed too coarsely to exacerbate the surface bending of the plating layer. In addition, the Zn—$MgZn_2$ binary eutectic structure is broadly formed, which may be unfavorable to securing uniform corrosion resistance and workability. However, when the cooling rate is more than 30° C./s, solidification starts from a liquid phase to a solid phase during the hot dip plating and rapid solidification occurs in a solid-liquid section of 60 to 100° C. which is a temperature range where all liquid phases change to solid phases, and the alloy structure is not uniformly formed, so that locally non-uniform corrosion resistance results may be shown. In addition, diffusion of the Fe—Al—Zn phase is insufficient, so that formation of the interfacial alloy phase does not grow into a dendritic form and is excessively suppressed to deteriorate workability. In addition, an amount of nitrogen used is increased for an excessive cooling rate to increase manufacturing costs.

MODE FOR INVENTION

Hereinafter, the present disclosure will be specifically described through the following examples. It should be noted that the following examples are only for understand the present disclosure, and are not intended to specify the right scope of the present disclosure.

EXAMPLES

First, as a base steel sheet, a cold rolled steel sheet including: 0.018% of C, 0.2% of Mn, 0.001% of Si, 0.009% of P, and 0.022% of Al, with a remainder of Fe and inevitable impurities was prepared. Thereafter, hot dip galvanizing was performed so that a plating deposited amount of one side surface of the cold rolled steel sheet was 140 g/m$^2$, and then cooling was performed from a bath surface to a top roll at a rate of 15° C./s, thereby obtaining a Zn—Mg—Al-based alloy plated steel sheet.

At this time, in the composition of the plating solution, Al was changed to 2.8%-13% and Mg was changed to 2.2%-5.1%, by weight. The remainder except the inevitably present components in the plating bath was Zn. Component analysis of the plating layer was performed by dipping the plating layer in a 5% hydrochloric acid to be completely dissolved, and then performing wet analysis of the solution, and the results are shown in Table 1. For reference, in the following Table 1, Fe of the plating layer components was diffused from the base steel sheet during hot dip galvanization.

Meanwhile, the plated steel sheet was manufactured by dipping the steel sheets having the plating layer compositions of the following Table 1 in a plated bath having a temperature of Table 2, and at this time, the thickness of the interfacial alloy layer of the finally manufactured hot-dipped galvanized steel sheet was measured and is shown in the following Table 2. In addition, for comparison, the target interfacial alloy layer thickness calculated depending on the plated bath temperature by Relation 1 is also shown in the following Table 2.

TABLE 1

| No. | Plating layer component (wt %) | | | |
| --- | --- | --- | --- | --- |
|  | Al | Mg | Fe | Si |
| 1 | 11.7 | 4.2 | 0.54 | — |
| 2 | 13.0 | 5.1 | 0.66 | — |
| 3 | 11.2 | 3.5 | 0.05 | 0.2 |
| 4 | 11.8 | 2.2 | 0.05 | 0.2 |
| 5 | 2.8 | 2.7 | 0.03 | — |
| 6 | 11.8 | 4.8 | 8.1 | — |
| 7 | 13.0 | 5.2 | 8.7 | — |
| 8 | 12.5 | 5.0 | 7.1 | — |

TABLE 2

| No. | Classification | Relation 1 | | Average thickness (μm) of final interfacial alloy layer |
| --- | --- | --- | --- | --- |
|  |  | Plating bath temperature (° C.) | Calculated interfacial alloy layer thickness (μm) |  |
| 1 | Inventive Example 1 | 490 | 1.186 | 1.1 |
| 2 | Inventive Example 2 | 500 | 1.73 | 1.4 |
| 3 | Comparative Example 1 | 480 | 0.802 | <0.1 |
| 4 | Comparative Example 2 | 490 | 1.186 | <0.1 |
| 5 | Comparative Example 3 | 410 | 2.594 | 0.1 |
| 6 | Comparative Example 4 | 530 | 4.322 | (Entire plating layer alloyed) |
| 7 | Comparative Example 5 | 540 | 5.506 | (Entire plating layer alloyed) |
| 8 | Comparative Example 6 | 570 | 10.018 | (Entire plating layer alloyed) |

As seen from Tables 1 and 2, in Inventive Examples 1 and 2, plating was performed under the conditions in which the plating component system and the plating bath temperature range suggested in the present disclosure were all satisfied. In addition, Comparative Examples 1 and 2 showed the case in which a Mg content was less than 4.0% which is a range suggested in the present disclosure and Si is added, and Comparative Example 3 illustrates the case in which a plated steel sheet was manufactured using a plating bath having less Mg and Al contents. In addition, in Comparative Examples 4 to 6, the plating Al and Mg component system suggested in the present disclosure was satisfied, but unlike Inventive Examples 1 and 2, the plating bath temperature range was as high as 530° C. or higher, so that alloying between the plating layer and the base steel sheet excessively occurred, and a Fe component in the plating layer was contained at a level of 7.1 to 8.7%.

Table 2 illustrates the thickness of the interfacial alloy layer calculated by Relation 1 depending on the plating bath temperature, and the average thickness of the final interfacial alloy layer. Inventive Examples 1 and 2 satisfied the plating bath temperature range of 470 to 520° C. suggested in the present disclosure, and it is confirmed that the thickness of the interfacial alloy layer calculated by Relation 1 and the thickness of the final interfacial alloy layer were similar. However, Comparative Examples 1 to 3 are the case of being out of the plating component system suggested in the present disclosure, and in Comparative Examples 1 and 2, it is confirmed that the thickness of the interfacial alloy layer as the component system containing Si which is a component suppressing alloying between the base steel sheet and the plating layer was less than 0.1 μm. Meanwhile, Comparative Examples 4 to 6 are the case in which the plating bath temperature was 530° C., 540° C., and 570° C., respectively, so that it is out of the plating bath temperature range which may be applied to Relation 1.

Thereafter, each plated steel sheet manufactured was cut in a direction perpendicular to the longitudinal direction, the cross section was taken at 2,000× by FE-SEM, and the results are shown in FIG. 1. FIG. 1 is a photograph of a cross section of the hot-dipped galvanized steel sheet of Inventive Example 1 which is a preferred exemplary embodiment in the present disclosure, observed by a field emission scanning electron microscope (hereinafter, referred to as "FE-SEM") (2000× magnification). Further, FIG. 2 is a photograph of a surface of an interfacial alloy layer of the hot-dipped galvanized steel sheet of Inventive Example 1 which is a preferred exemplary embodiment in the present disclosure, observed by FE-SEM (10,000× magnification).

As shown in Table 1, it is confirmed that the plating layer of Inventive Example 1 included a Zn—Al—MgZn$_2$ ternary eutectic structure and a Zn—MgZn$_2$ binary eutectic structure, and included a Zn solid-solubilized Al phase structure, a Zn phase structure, and a MgZn$_2$ structure. In addition, it is recognized that an Al structure expressed in dark was positioned in the MgZn$_2$ structure. In addition, as in FIG. 2, it is also confirmed that the interfacial alloy layer of Fe—Al—Zn was formed in a dendritic form having a thickness of 0.5 μm or more and 2 μm or less.

FIG. 3 is mapping photographs of Fe, Al, and Zn components of a replica sample obtained from cross section polishing for an interfacial alloy layer of the hot-dipped galvanized steel sheet of Inventive Example 1 which is a preferred exemplary embodiment in the present disclosure, observed by TEM-EDS. FIG. 4 illustrates weight percentages (wt %) detected along a yellow line marked on FIG. 3 for the interfacial alloy layer of the hot-dipped galvanized steel sheet of Inventive Example 1 which is a preferred exemplary embodiment in the present disclosure.

As shown in FIGS. 3 and 4, it is confirmed that Si was not contained in the components of the interfacial alloy layer, and an alloy phase having a composition range of: 20 to 35 wt % of Fe, 15 to 30 wt % of Al, and 30 to 36 wt % of Zn was formed.

Meanwhile, for Inventive Examples 1 and 2 and Comparative Examples 1 to 3, for evaluating the bending workability and corrosion resistance of the steel sheet depending on the plating layer components, physical properties were evaluated according to the following criteria. At this time, in Comparative Examples 4 to 6, the entire plating layer was alloyed, corrosion resistance evaluation was excluded from the evaluation of physical properties.

(1) Evaluation of Corrosion Resistance

Each plated steel sheet was charged into a salt spray testing machine, and a titration occurrence time was measured by the international specification (ASTM B117-11). At this time, a 5% brine (temperature: 35° C., pH 6.8) was used, and a brine was sprayed at 2 ml/80 cm² per hour. Further, in order to exclude the influence of difference in plating deposited amount, a time (hr) elapsed until titration occurred was divided by a plating deposited amount (g/m²) to obtain a value which was expressed as a corrosion resistance index for evaluation.

o: more than 50
Δ: 10 to 50
x: less than 10

(2) Bending Workability

After 90° bending (bending diameter: 3R), 3T bending, 1T bending, and 0T bending processing at the same material thickness (1.2t) and the same plating deposited amount (275 to 285 g/m²), a length of 1 mm of a bending processing top was observed with SEM, and then the width of the bending cracks was observed and averaged for evaluation.

◎: width of bending cracks of 30 μm or less
o: width of bending cracks of more than 30 μm and 60 μm or less
Δ: width of bending cracks of more than 60 μm and 100 μm or less
x: width of bending cracks of more than 100 μm

TABLE 3

| Classification | Corrosion resistance | Interfacial alloy layer component | Interfacial alloy layer shape | Bending workability 90° | 3T | 1T | 0T |
|---|---|---|---|---|---|---|---|
| Inventive Example 1 | o | Fe—Al—Zn | Dendritic form | ◎ | ◎ | o | Δ |
| Inventive Example 2 | o | Fe Al Zn | Dendritic form | ◎ | ◎ | o | Δ |
| Comparative Example 1 | Δ | Fe Al Zn Si | — | o | Δ | X | X |
| Comparative Example 2 | Δ | Fe Al Zn Si | — | o | Δ | Δ | X |
| Comparative Example 3 | Δ | Fe Al Zn | — | ◎ | ◎ | o | Δ |
| Comparative Example 4 | — | Fe Al Zn | — | X | X | X | X |
| Comparative Example 5 | — | Fe Al Zn | — | X | X | X | X |
| Comparative Example 6 | — | Fe Al Zn | — | X | X | X | X |

As confirmed from Table 3, in Comparative Examples 1 to 3 in which the compositions of Mg and Al of the plating layer components did not satisfy the conditions of the present disclosure, corrosion resistance was poor as compared with Inventive Examples 1 and 2. In particular, in Comparative Examples 1 and 2, bending workability was poor, and representatively, the widths of the bending cracks produced in 90° bending and 0T bending processing did not satisfy the conditions of ranges of 30 μm or less and 100 μm or less, respectively, and it is confirmed that from 3T bending processing which is more severe conditions than 90° bending processing, the width of bending cracks was significantly decreased as compared with Inventive Examples 1 and 2. The excellent bending processing characteristics of Inventive Examples 1 and 2 as such is considered as resulting from the interfacial alloy phase in the dendritic form which causes an anchoring effect to work favorably for reducing cracks in bending processing. In addition, in Comparative Examples 4 to 6 in which the composition component of the plating bath was in the range of the present disclosure, but the plating bath temperature was out of the range of the present disclosure, it is confirmed that the interfacial alloy layer was not in the dendritic form suggested in the present disclosure, and alloying proceeded in the entire plating layer, so that the width of the bending cracks was more than 100 μm, and bending workability was shown to be very poor.

FIG. 5 is photographs of cracks produced on a bending processing top after performing a 90° bending processing on the hot-dipped galvanized steel sheet of Inventive Example 1 which is a preferred exemplary embodiment in the present disclosure, observed by FE-SEM (100×, 200×, and 300× magnifications).

FIG. 6 is photographs of cracks produced on a bending processing top after performing a 90° bending processing on a hot-dipped galvanized steel sheet of Comparative Example 1, observed by FE-SEM (100×, 200×, and 300× magnifications).

As seen from FIGS. 5 and 6, the bending workability properties of Inventive Example 1 were better than those of Comparative Example 1, and were equivalent to Comparative Example 3 having excellent bending workability since there was no coarsened Al or $MgZn_2$ structure in the plating layer.

Meanwhile, FIG. 7 is a photograph of a cross section of Comparative Example 4, observed by FE-SEM (2,000× magnification). Further, FIG. 8 is a photograph of the cross section of Comparative Example 5, observed by FE-SEM (2,000× magnification), and FIG. 9 is a photograph of the cross section of Comparative Example 6, observed by FE-SEM (2,000× magnification).

As shown in FIGS. 7 to 9, in all of Comparative Examples 4 to 6, it is confirmed that the entire plating layer was alloyed with the base steel sheet, so that the interfacial alloy layer of Fe—Al—Zn having a thickness of more than 2 μm was produced.

The present disclosure is not limited to the embodiments and the examples, but may be made in various forms different from each other, and those skilled in the art will understand that the present disclosure may be implemented in other specific forms without departing from the spirit essential feature of the present disclosure. Therefore, it should be understood that the above-mentioned embodiments and examples are illustrative in all aspects, not restrictive.

The invention claimed is:

1. A hot-dipped galvanized steel sheet comprising:
   a base steel sheet;
   a Zn—Mg—Al-based plating layer which is provided on at least one surface of the base steel sheet and comprises, by weight:
   5.1 to 25% of Al and
   4.0 to 10% of Mg,
   with a remainder of Zn and other inevitable impurities; and an interfacial alloy layer having a Fe—Al—Zn composition formed between the base steel sheet and the plating layer,
wherein the interface alloy layer has a thickness of 0.5 to 2 μm and is in a dendritic form, and
wherein the Zn—Mg—Al-based plating layer has:
- a structure including one or more of a Zn—Al—MgZn$_2$ ternary eutectic structure, a Zn—MgZn$_2$ binary eutectic structure, a Zn-solid solubilized Al phase structure, and a Zn phase structure; and
- a MgZn$_2$ structure including agglomerated Al.

2. The hot-dipped galvanized steel sheet of claim 1, wherein Al and Mg contents are determined to be positioned in a 2-eutectic line of MgZn$_2$ and Al in a Mg—Al—Zn ternary phase diagram.

3. The hot-dipped galvanized steel sheet of claim 1, wherein widths of bending cracks produced in 90° bending and OT bending processing of the hot-dipped galvanized steel sheet are 30 μm or less and 100 μm or less, respectively, and
wherein the widths were measured after the 90° bending and OT bending processing at the same steel sheet thickness, a length of 1 mm of a bending processing top was observed with SEM, and then the widths were observed and averaged.

4. A manufacturing method of the hot-dipped galvanized steel sheet of claim 1, the method comprising:
preparing the base steel sheet;
hot dip galvanizing the base steel sheet in a plating bath comprising, by weight: 5.1 to 25% of Al and 4.0 to 10% of Mg, with a remainder of Zn and other inevitable impurities; and
cooling the plated steel sheet, starting from a plating bath surface to a top roll section, at a cooling rate of 5 to 30° C./s, using inert gas, thereby manufacturing the hot-dipped galvanized steel sheet in which the interface alloy layer and the Zn—Mg—Al-based plating layer are sequentially formed on the base steel sheet,
wherein the plating bath has a temperature (T), and
wherein the base steel sheet is plated by being dipped in the plating bath to allow a thickness (H) of the interface alloy layer defined by the following Relation 1 to satisfy a range of 0.5 to 2 μm:

$$H(\mu m) = 170.53 + 0.0008T^2 - 0.7376T. \qquad \text{[Relation 1]}$$

5. The manufacturing method of claim 4, wherein the temperature of the plating bath is maintained in a range of 470 to 520° C.

6. The manufacturing method of claim 4, wherein Al and Mg contents in the plating bath are determined to be positioned in a 2-eutectic line of MgZn$_2$ and Al in a Mg—Al—Zn ternary phase diagram.

* * * * *